(12) United States Patent
Keese

(10) Patent No.: US 6,930,063 B2
(45) Date of Patent: Aug. 16, 2005

(54) NON-CURLING REINFORCED COMPOSITE MEMBRANES WITH DIFFERING OPPOSED FACES, METHODS FOR PRODUCING AND THEIR USE IN VARIED APPLICATIONS

(75) Inventor: Frank M. Keese, Cambridge, NY (US)

(73) Assignee: Saint-Gobain Performance Plastics Corporation, Wayne, NJ (US)

( * ) Notice: Subject to any disclaimer, the term of this patent is extended or adjusted under 35 U.S.C. 154(b) by 238 days.

(21) Appl. No.: 09/765,695

(22) Filed: Jan. 18, 2001

(65) Prior Publication Data

US 2001/0034170 A1 Oct. 25, 2001

Related U.S. Application Data

(60) Provisional application No. 60/176,779, filed on Jan. 19, 2000.

(51) Int. Cl.$^7$ .................................. B32B 27/12
(52) U.S. Cl. .................. 442/67; 442/64; 442/65; 442/66; 442/71; 442/97; 442/98; 442/101; 442/104; 442/172; 442/180
(58) Field of Search .................... 442/64, 65, 66, 442/67, 71, 97, 98, 101, 104, 172, 180, 103, 260, 261, 399; 428/421, 422

(56) References Cited

U.S. PATENT DOCUMENTS

| | | | | |
|---|---|---|---|---|
| 3,941,741 A | * | 3/1976 | De Zuba et al. | 524/262 |
| 4,526,830 A | * | 7/1985 | Ferziger et al. | 442/139 |
| 4,635,788 A | * | 1/1987 | McDonald | 198/848 |
| 5,021,109 A | * | 6/1991 | Petropoulos et al. | 156/137 |
| 5,217,797 A | * | 6/1993 | Knox et al. | 428/167 |
| 5,230,937 A | * | 7/1993 | Effenberger et al. | 428/113 |
| 5,439,631 A | * | 8/1995 | Schneider et al. | 264/293 |
| 6,352,150 B1 | * | 3/2002 | Lewis | 198/846 |

FOREIGN PATENT DOCUMENTS

EP          0125955          11/1984

* cited by examiner

*Primary Examiner*—Ula Ruddock
(74) *Attorney, Agent, or Firm*—Foley & Lardner LLP

(57) ABSTRACT

A double-faced PTFE-silicone rubber reinforced composite with curling tendency controlled is achieved by coating one side of a balanced PTFE/glass composite with liquid silicone rubber. Each face of the composite can perform independent functions in a single application, thereby optimizing performance.

23 Claims, 1 Drawing Sheet

NON-CURLING REINFORCED COMPOSITE MEMBRANES WITH DIFFERING OPPOSED FACES, METHODS FOR PRODUCING AND THEIR USE IN VARIED APPLICATIONS

This application claims the benefit of U.S. Provisional Application No. 60/176,779, filed Jan. 19, 2000, under 35 U.S.C. §119(e).

BACKGROUND OF THE INVENTION

This invention relates to new and useful reinforced composite membranes for use in conveying, material handling, surface modifying, surface protection, and barrier applications, in which the two opposing faces of the membrane differ significantly in composition and physical characteristics, each face being constructed to perform independent functions in a given single application, thereby optimizing overall performance.

More specifically, this invention relates to reinforced composite membranes in which one face is a perfluoropolymer, such as polytetrafluoroethylene (PTFE), and the other face is an elastomer. Although the use of elastomeric materials of varied compositions is contemplated, silicone rubber is the preferred elastomeric component.

Polytetrafluoroethylene (PTFE) coated fiberglass fabrics and silicone rubber coated fiberglass fabrics are examples of reinforced composite membranes commonly used in many of the applications mentioned above. The two materials share several unique and valuable physical properties: flexibility, thermal stability in operating environments exceeding 350° F., and low-energy surfaces providing easy release to sticky, viscous, or adhesive materials. On the other hand, they may differ markedly in surface hardness, finish, frictional characteristics, and surface qualities difficult to specify but related to the way the surface adheres to other surfaces. PTFE has one of the lowest coefficients of friction possessed by any common material and exhibits minimal "stick-slip" behavior. On the other hand, silicone rubber, depending on its composition, finish, and hardness (durometer), often has the high coefficient of friction and pronounced stick-slip behavior or "grabby" quality typically associated with elastomeric materials.

The choice of whether to use a PTFE or a silicone rubber composite in a given application sometimes involves consideration of the materials' frictional and related surface characteristics. Certain applications may require a material with a low coefficient of friction, in which case PTFE composites would be expected to perform very well, while silicone rubber constructions would not. In other applications, a material with a high coefficient of friction or stick-slip characteristics may be required, in which cases a silicone rubber material would answer readily, while a PTFE construction would not.

However, in some applications, a membrane with the frictional and related surface characteristics of PTFE on one face and those of an elastomer on the other face may be needed. To address this need, efforts have been made to combine the two materials in a double-faced membrane, with PTFE on one face and silicone rubber on the opposite face. In the past, these attempts have yielded materials with a strong tendency to curl, making their handling extremely difficult and limiting their usefulness. The curling tendency is due to imbalanced stresses generated in manufacturing these composites, the result of differences in the curing characteristics, thermal coefficients of expansion, and modulae of the two components. It is the object of this invention to produce double-faced PTFE-elastomer reinforced composite membranes with curling tendency controlled to the extent that their handling characteristics and usefulness remain uncompromised.

SUMMARY OF THE INVENTION

The invention achieves a double-faced PTFE-silicone rubber reinforced composite with curling tendency controlled by coating one side of a balanced PTFE-coated glass composite with liquid silicone rubber. The composite comprises two opposing faces, wherein one face is composed of a perfluoropolymer, such as PTFE, and the other face is composed of an elastomer, such as silicone rubber. The composite consequently can perform independent functions in a single application, thereby optimizing performance.

DESCRIPTION OF THE INVENTION

Figure 1:
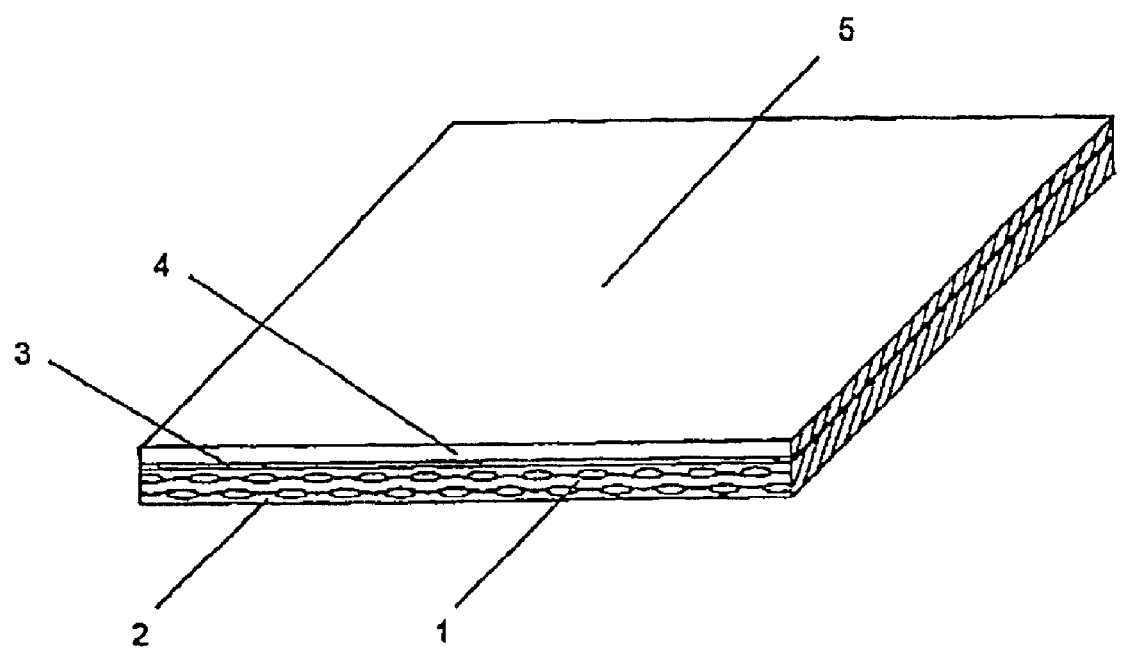
FIG. 1 shows a perspective and cut away view of an exemplary composite of the invention.

In accordance with one embodiment the invention, a continuous web of a glass fabric-reinforced composite, with PTFE on one face and silicone rubber on the opposite face, is produced by dip-coating, knife-over-roll coating, metering and/or wiping, and thermal curing processes.

To produce the membrane in a continuous process, woven reinforcement, which may comprise fiberglass, aramid, or other fiber able to tolerate PTFE processing temperatures and suited to the end use of the membrane, is paid off a roll and saturated and/or coated with PTFE by dipping through an aqueous dispersion or latex of the resin, removing the excess dispersion by wiping or metering, drying to remove the water, baking to remove most of the surfactant, and finally heating sufficiently to sinter or fuse the PTFE. Typically, the coating operation will be repeated several times in order to apply the desired amount of PTFE free of cracks and other defects. Alternately, the fusing step is eliminated in the first several passes, and the multiple layers of unfused PTFE resin applied thus are smoothed and consolidated by passing the web through a calendar machine, prior to fusing and the application of one or more subsequent layers of fused PTFE resin to complete the composite. In any case, the PTFE resin is applied in such a way as to "balance" the mechanical forces or residual stresses within the PTFE resin on each coating face so that the composite lies flat and does not tend to curl. One way of achieving a balanced-coating is to apply equal amounts of PTFE to both faces and subject the faces to the same processing conditions. The coating of PTFE should be as thin as possible, while sufficient to achieve the desired function. Although a variety of coating thicknesses of PTFE to serve a variety of functions are contemplated by the invention, a coating thickness of about 1–5 mils (1 mil equals 0.001 in.) is preferred. All the technology involved is familiar to those skilled in the art of producing PTFE coated fabric reinforced composites, described for example in U.S. Pat. No. 5,141,800 to Effenberger et al., incorporated herein by reference.

In the next step in the process, one face of the PTFE/glass composite is rendered bondable by coating with a mixture of a colloidal silica dispersion, for example DuPont Ludox® 40, and a perfluorinated copolymer resin dispersion, such as fluorinated ethylene propylene (FEP) or perfluoroalkoxy-modified tetrafluoroethylene (PFA). This is applied by dipping, wiping, drying, baking, and fusing, essentially as the PTFE dispersions were applied. Alternately, one face may be rendered bondable by treatment, under appropriate conditions and with appropriate pre- and post-treatment processing, with a mixture of sodium metal, naphthalene, and a glycol ether, or alternately, a mixture of sodium metal and anhydrous ammonia. If applicable, other means of chemical and electrochemical treatments, metal sputtering, and vacuum deposition of metals or metal oxides, might be employed. Once again, the technology involved in applying bondable treatments to PTFE surfaces is thoroughly described in the literature and is familiar to those skilled in the art of processing PTFE films, articles, and composites of all kinds.

In the final step, the face of the PTFE/glass composite rendered bondable in the previous step is coated with a controlled amount of a relatively low viscosity (ca. 10,000 to 200,000 centipoises) platinum catalyzed, addition cure, 100 percent solids, solventless, liquid silicone rubber (LSR) formulation. The LSR coating should be as thin as possible, only as thick as necessary to achieve the desired function. Although a variety of coating thicknesses of silicone rubber to serve a variety of functions are contemplated by the invention, a coating thickness of about 2–50 mils is preferred. The LSR formulation is composed of commercially available A and B components that are mixed in a specified ratio, typically 1:1 or 10:1. Each component contains vinyl-terminated polydimethylsiloxane polymers and may contain fumed silica as a reinforcing filler, and/or extending fillers. Typically, one component, for instance the A component, contains the catalyst and the B component contains a crosslinking agent and an inhibitor that is removed by heating to allow the LSR to cure into a solid rubber. The LSR formulation may incorporate pigments and/or other additives. The membrane thus coated is completed by passing it through a coating oven or other heating device, raising the temperature of the coating sufficiently to drive off or decompose the inhibitor allowing the LSR to cure into a solid rubber.

Alternately, the web may be coated with a silicone rubber incorporating an organic peroxide catalyst ("heat-curable" silicone) which may be applied from a solvent solution, dried if necessary to remove the solvent and heated appropriately to effect a cure, or with silicone rubber incorporating an atmospheric-moisture-activated acetoxy cure system ("one-package" RTV), once again perhaps from a solvent solution, dried if necessary to remove the solvent and allowed to remain exposed to moist air sufficiently long to effect a cure, perhaps being heated to accelerate the process.

The resulting composite is a durable, two-faced material with one face PTFE and one face silicone rubber. The composite exhibits flexural modulus about that of a plain PTFE/glass fabric composite comprising the same reinforcement fabric and percent PTFE, and has little tendency to curl.

Should it be desirable, ribs, lugs, cleats, or other protuberances composed of rubber that is the same or similar in composition to the rubber face of the composite may be formed on the relatively smooth rubber face by applying beads of flowable, uncured rubber by the use of robotically controlled applicators or by methods similar to those described in co-pending application Ser. No. 09/608,649, filed Jun. 30, 2000, the subject matter of which is incorporated by reference herein. The material applied is then cured, depending on its type, according to the procedures in the paragraphs above. The rubber must be sufficiently viscoelastic to permit retention of its shape without flowing excessively during the time required to apply the required number of cleats and transfer the work to an oven or other heating device or other environment in which the cure is effected.

Unlike other elastomers, silicone rubber has low surface energy. Surprisingly, the surface of silicone rubber is tacky when dry, yet very slippery when water is present on the surface. This feature of silicone rubber results in unique advantages and end uses which are contemplated by the invention.

FIG. 1 shows an exemplary composite of the invention in which a fiberglass reinforcement (1) is coated on both faces with PTFE (2). A mixture of a colloidal silica dispersion (3) is applied to one surface of the PTFE-coated fabric. The application of the colloidal silica dispersion (3) renders the surface bondable. The PTFE/fiberglass face rendered bondable by dispersion (3) is coated with silicone rubber (4,5) to achieve a composite with one face PTFE and one face silicone rubber (5).

EXAMPLE 1

One face of a roll of commercially available PTFE/glass fabric (Chemfab Chemglas® Basic 5), containing style 2116 glass fabric as a reinforcement and comprised of about 50 percent by weight PTFE resin and 50 percent by weight glass, is rendered bondable by applying a mixture of colloidal silica dispersion (DuPont Ludox® 40), PFA fluoropolymer resin solution (Dupont TE-9946), surfactants, stabilizers, and water; wiping off the excess; drying; baking; and fusing. The fabric weighs about 5.4 ounces per square yard (osy) and is about 0.005 inches thick.

Using conventional PTFE tower-coating equipment, a coating of an LSR formulation composed of 50 parts by weight each of Wacker Silicones Elastosil® LR6289A and LR6289B and about 12 parts by weight of a red iron oxide masterbatch containing about 35 percent iron oxide and about 65 percent vinyl terminated silicone polymer, is applied to the bondable face of the Chemglas Basic 5. The tower is operated to provide conditions of time and temperature sufficient to cause the rubber to cure. The end result is a composite with a smooth, glossy coating of silicone rubber on one face and a PTFE surface on the opposite face. The whole weighs about 7.5 osy; the silicone rubber coating is about 0.002 inches thick and is strongly adhered. The composite lays flat and can be handled easily without curling.

The example composite is fabricated into a belt for a combination weighing/packaging machine for meat and other food products. In the heat-sealing section of the machine, the non-working face of the belt, i.e., the face that does not contact the product being weighed and wrapped, must slide freely over a heated platen. In another section of the machine, the wrapped package must be conveyed up an incline without slipping back. An all-PTFE belt slides freely over the heating platen but allows the package to slip back at the incline. An all-silicone belt carries the package up the incline without slipping, but does not slide freely over the heated platen. The example belt functions optimally in both sections of the machine.

EXAMPLE 2

One face of another roll of the PTFE/glass fabric used in the above example is rendered bondable by treatment with a solution of sodium, naphthalene, and glycol ether. It is coated using the procedure described in Example 1, yielding a composite with physical properties almost identical to those of Example 1.

EXAMPLE 3

One face of a length of Chemltas 64-40916, a Chemfab product comprised of Style number 64 glass fabric saturated/coated with 40 percent by weight PTFE, is rendered bondable by application of the colloidal silica formulation as described in Example 1 and coated with 8 osy. of silicone rubber. The resulting product is fabricated into a belt 50 meters long and 1.5 meters wide. It is substituted for a conventional glass-reinforced silicone rubber belt used as a conveyor and release surface in the assembly of plastic wine bags by heat sealing. The silicone release surface of the conventional belt performs to the user's satisfaction, but the construction is difficult to drive on the user's equipment due to excessive frictional force generated when the rubber non-working face of the belt, i.e., the face that does not contact the product, slides over stationary components of the machine. The PTFE non-working face of the example belt generates minimal frictional force against the machine's stationary surfaces, allowing it to be easily driven, while the working face provides the silicone rubber release surface desired.

EXAMPLE 4

A conveyor belt with raised cleats for use in a fast-food-service toaster in which the bread products being toasted are slid across a heated platen or griddle by means of force transmitted by the moving belt, is produced as follows. A rectangle or belt "blank" of appropriate size is cut from the composite of Example 1. Using a robotic applicator, a pattern of many, identically-shaped raised cleats is laid down on the silicone rubber face of the blank. The cleats are composed of the same LSR formulation as the face itself Each cleat is about 0.8 inches long and roughly simicircular in cross section, about 0.2 inches wide at the base and 0.04 inches high at the highest point. The longitudinal centerline of the cleat is a straight line oriented perpendicular to the direction of travel of the finished conveyor belt. The LSR forming the cleats has viscoelasticity that allows it to retain its shape during the time it takes to apply the entire pattern of cleats. After the pattern is applied, the blank is placed in an oven operating at 500° F. and allowed to remain for two minutes. When the blank is removed from the oven the silicone rubber surface bears a pattern of durable rubber cleats strongly adhered to the surface. The belt is completed by attaching lacings on two opposite ends. When installed on the toaster the cleats contacting the bread products being toasted, for example hamburger rolls, are found to drive the rolls more reliably, with less slippage, than a smooth-faced belt made of similar material.

What is claimed is:

1. A fiber-reinforced flexible composite membrane, the membrane comprising:

two compositionally distinct opposing faces;

a reinforcement consisting of glass fibers;

a perfluoropolymer material coating on each side of the reinforcement, the perfluoropolymer in a balanced state having mechanical forces within the perfluoropolymer equal on each side of the reinforcement to prevent the membrane from curling; and an elastomer disposed over the perfluoropolymer material on one side of the reinforcement, wherein the elastomer comprises a silicone rubber.

2. A fiber-reinforced flexible composite membrane according to claim 1, wherein the perfluoropolymer comprises PTFE.

3. A fiber-reinforced flexible composite membrane according to claim 1, wherein the perfluoropolymer material is applied in equal amounts to each face of the reinforcement.

4. A fiber-reinforced flexible composite membrane according to claim 1, wherein the silicone rubber is derived from an addition-cure, 100 percent solids, liquid silicone rubber composition.

5. A fiber-reinforced flexible composite membrane according to claim 4, wherein the liquid silicone rubber comprises one or more pigments.

6. A fiber-reinforced flexible composite membrane according to claim 4, wherein the liquid silicone rubber comprises an organic peroxide catalyst.

7. A method for producing the fiber-reinforced flexible composite membrane of claim 1, comprising:

a) coating a woven reinforcement able to tolerate perfluoropolymer processing temperatures with the perfluoropolymer and fusing the perfluoropolymer to a woven reinforcement to obtain a balanced perfluoropolymer/woven reinforcement composite;

b) rendering one face of the perfluoropolymer/woven reinforcement composite bondable to an elastomer;

c) coating the bondable face of the perfluoropolymer/woven reinforcement composite with a low viscosity, platinum, catalyzed, addition cure, solventless liquid silicone rubber elastomer; and d) curing the liquid silicone rubber into a solid rubber.

8. The method of claim 7, wherein the liquid silicone rubber comprises two components, one component containing a catalyst and the other component containing a crosslinking agent and an inhibitor.

9. The method of claim 8, wherein the two components comprise vinyl-terminated polydimethylsiloxane.

10. The method of claim 9, wherein the two components further comprise fumed silica.

11. The method of claim 8, wherein the two components are mixed in a ratio of 1:1.

12. The method of claim 8, wherein the two components are mixed in a ratio of 10:1.

13. The method of claim 8, wherein the perfluoropolymer is applied in equal amounts to both faces of the woven reinforcement.

14. The method of claim 8, wherein one face of the perfluoropolymer/woven reinforcement composite is rendered bondable by coating said one face with a mixture of a colloidal silica dispersion and a perfluorinated copolymer resin dispersion.

15. The method of claim 8, wherein one face of the perfluoropolymer/woven reinforcement composite is rendered bondable by treatment with a solution of sodium, naphthalene and glycol ether.

16. The method of claim 7, wherein the woven reinforcement is fiberglass or aramid.

17. A belt comprising a fiber-reinforced flexible composite according to any one of claims 1, 2, and 3–6.

18. A machine driven belt comprising a non-curling reinforced membrane belt comprising:

two compositionally distinct opposing faces;

a glass fiber reinforced fabric layer having two compositionally distinct opposed faces;

a PTFE coating applied to the fabric layer on both faces, the coating in a balanced state having mechanical forces within the PTFE equal on each side of the reinforcement to prevent said belt from curling; and a layer of silicone rubber applied to one of said opposed faces previously coated with PTFE.

19. A belt comprising:

two compositionally distinct opposing faces;

a first layer of perfluoropolymer material and a second layer of perfluoropolymer material;

a fibrous reinforcement intermediate the first and second layers of perfluoropolymer material; and an elastomer disposed over one of the first and second layers of perfluoropolymer material, wherein the elastomer comprises a silicone rubber;

wherein the first and second layers of perfluoropolymer material have a thickness sufficient to inhibit the belt from curling.

20. A fiber-reinforced flexible composite membrane having two compositionally distinct opposing faces, the membrane comprising:

a fibrous reinforcement;

a perfluoropolymer material coating on each side of the reinforcement, the perfluoropolymer in a balanced state having mechanical forces within the perfluoropolymer equal on each side of the reinforcement to prevent the membrane from curling; and an exposed elastomer disposed over the perfluoropolymer material on one side of the reinforcement having a thickness of 2 to 50 mils, wherein the elastomer comprises a silicone rubber.

21. A fiber-reinforced flexible composite membrane having two compositionally distinct opposing faces, the membrane comprising:

a fibrous reinforcement;

a perfluoropolymer material coating on each side of the reinforcement, the perfluoropolymer in a balanced state having mechanical forces within the perfluoropolymer equal on each side of the reinforcement to prevent the membrane from curling; and an elastomer disposed over the perfluoropolymer material on one side of the reinforcement wherein the weight ratio of the reinforcement to the perfluoropolymer coating is 50:50, wherein the elastomer comprises a silicone rubber.

22. An apparatus for moving objects comprising:

a machine; and a belt capable of being driven by the machine;

wherein the belt comprises:

a first layer of perfluoropolymer material and a second layer of perfluoropolymer material;

a fibrous reinforcement intermediate the first and second layers of perfluoropolymer material; and an elastomer disposed over one of the first and second layers of perfluoropolymer material and having a thickness of 2 to 50 mils, wherein the elastomer comprises a silicone rubber;

wherein the first and second layers of perfluoropolymer material have a thickness sufficient to inhibit the belt from curling.

23. An apparatus according to claim 22, wherein the perfluoropolymer comprises PTFE.

* * * * *